UNITED STATES PATENT OFFICE.

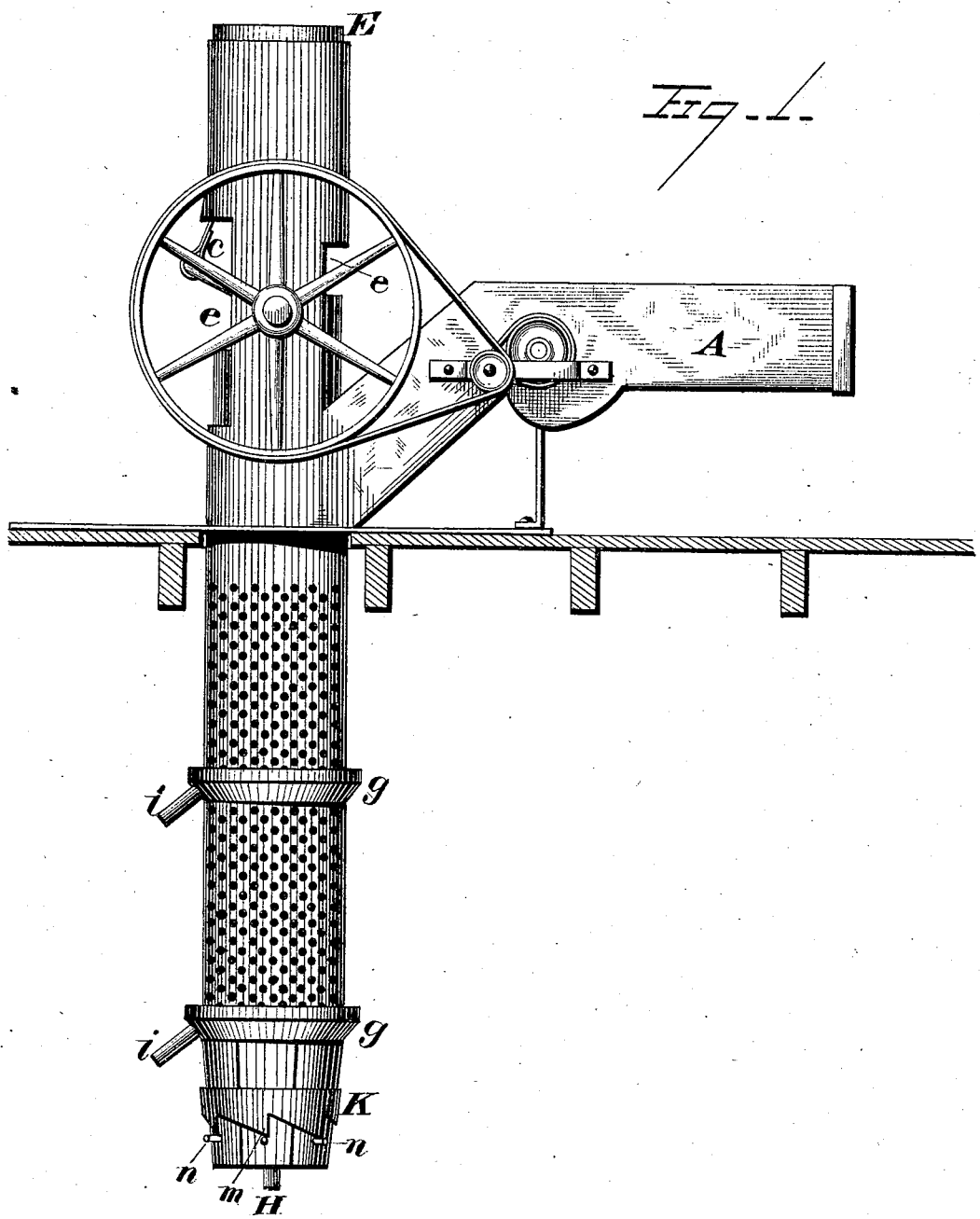

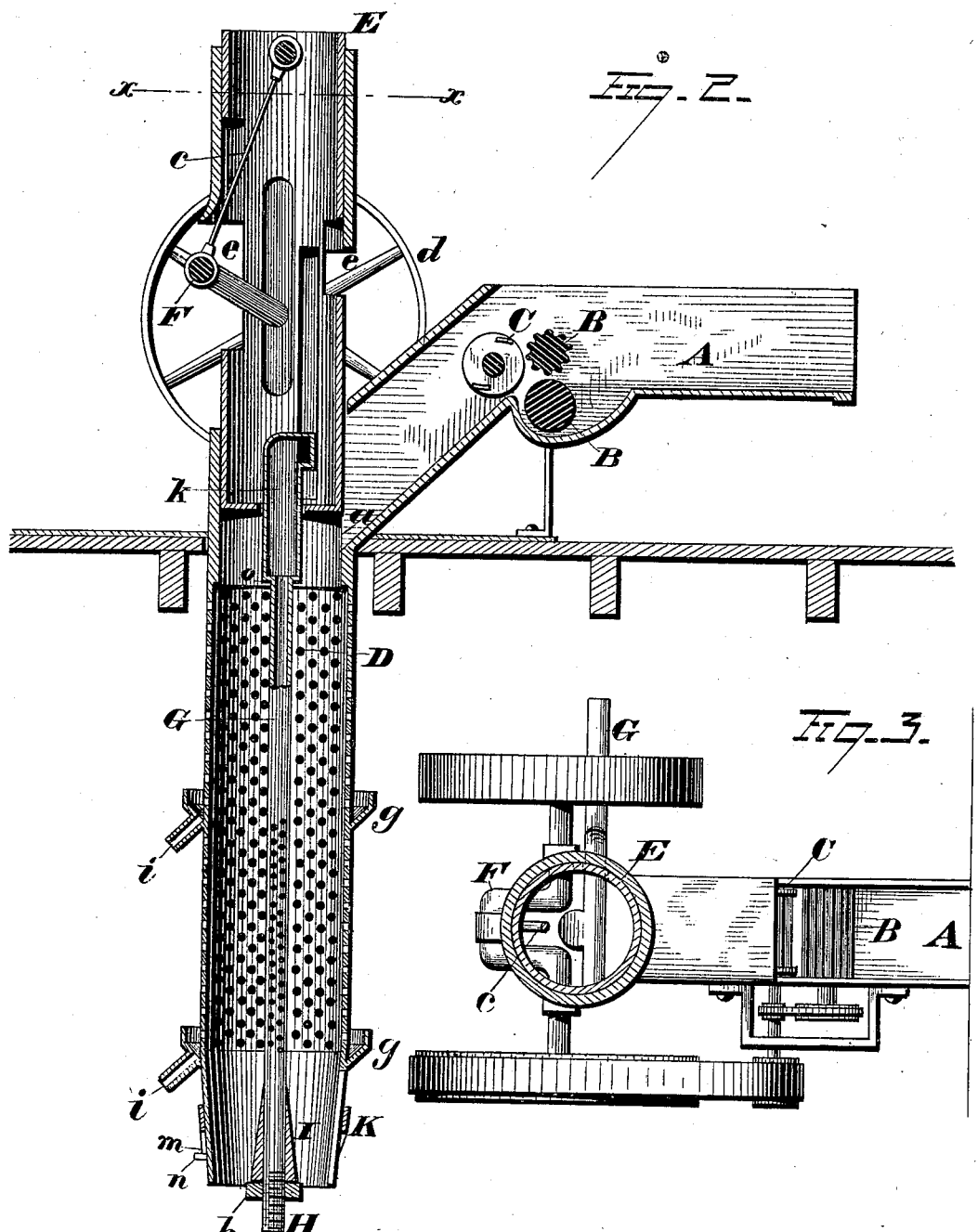

GEORGE W. SOULE, OF MERIDIAN, MISSISSIPPI.

CANE-MILL AND PROCESS OF EXTRACTING SACCHARINE SUBSTANCES.

SPECIFICATION forming part of Letters Patent No. 254,575, dated March 7, 1882.

Application filed March 17, 1881. (Model.)

*To all whom it may concern:*

Be it known that I, GEORGE W. SOULE, of Meridian, in the county of Lauderdale and State of Mississippi, have invented certain new and useful Improvements in Cane-Mills and Processes of Extracting Saccharine Substances; and I do hereby declare the following to be a full, clear, and exact description of the invention, such as will enable others skilled in the art to which it pertains to make and use it, reference being had to the accompanying drawings, which form part of this specification.

My invention relates to an improvement in cane-mills and process for extracting saccharine substances from canes, the object being to provide a combined cutting and pressing apparatus for insuring a continuous operation of cutting the cane and pressing the saccharine juices therefrom, and to provide a process for supplementing the action of the machine and expelling practically all of the juices from the cane.

With these ends in view my invention consists in a cane-mill embracing certain features of construction and combinations of parts, as will be hereinafter described, and pointed out in the claims.

My invention also consists in a process of extracting saccharine substances from juice-producing substances, which process will be hereinafter explained, and specified in the claims.

In the accompanying drawings, Figure 1 is a view in side elevation of my machine in position. Fig. 2 is a vertical section of the same, and Fig. 3 is a plan view through the line $x\ x$ of Fig. 2.

A represents a receiver, into which the cane is placed and fed to the revolving cutter by the feed-rolls B. These feed-rolls may be either ribbed or smooth, or an endless apron may be used with or without either of the feed-rolls, and they are so situated that the cane passing along on the bottom of the receiver comes between the rolls, and is gradually fed and held in position until acted on by the rapidly-revolving cutter C. This cutter is situated at the angle formed by the downward inclination of the rear end of the receiver, which causes the cane as it is cut to gravitate downward and into the chamber D through the opening $a$. This chamber or receptacle D is perforated at its lower part, as shown, for allowing the juice of the cane to exude as it is pressed therefrom, and the upper part thereof forms a guideway, in which reciprocates the plunger E. The plunger is operated by a crank-shaft, F, passing through the chamber D, a little to one side of the center of the same, and connected therewith at its upper end by a connecting-rod, $c$, the said plunger being extended upward a sufficient distance to permit the use of a connecting-rod of the proper length. The object of placing the crank-shaft a little to one side of the center is to apply the power nearly in a vertical line during the downstroke of the plunger. The plunger may be operated by any suitable means, but when operated by the crank above described it can be driven either by gearing, belting, or by an engine connected directly to the crank-shaft. If driven, however, in any of the ways above mentioned, one or more heavy fly-wheels, $d$, should be secured to the shaft, to as nearly as possible equalize the power and cause the plunger to work steadily and smoothly in the cylinder. The plunger is made to conform to the shape of the cylinder, and is provided with slots for the passage of the crank-shaft and steam-pipe, and with openings $e$ to allow the crank-shaft to revolve freely without striking the same, and thus allow a longer stroke to the plunger. The lower part of the cylinder, or that part beneath the floor, is perforated to allow the juices to exude from the interior thereof, and is also provided with two or more annular troughs on the outside of the same, (two being shown in the present instance,) adapted to collect the juices as they are pressed from the cane, and discharge them through suitable pipes, $i$, to the proper receiving-tanks.

G is the steam or water pipe, passing through the cylinder D and plunger E into the interior of the chamber above the bottom of the plunger, so as not to interfere with its operation, where it becomes enlarged so as to form a steam or water space, $k$. The pipe then passes downward through the center of the plunger-head and through the center of the perforated chamber to near the bottom of the said chamber. That part of the pipe between the annular troughs is perforated similar to the chamber D for the discharge of the steam or water. The steam or water, either hot or cold, is introduced into the chamber and forced through the cut cane while the same is still under pressure, and effectually extracts any saccharine matter that may be left therein.

H is a rod attached to and closes the lower end of the steam or water pipe G, and extends downward therefrom and forms a guide or bearing on which the cone I is moved. The cone I is held in position on the rod H by a nut, b, screwed thereon, and is adapted to be moved up and down on said rod to decrease or increase the opening at the lower part of the cylinder, thereby allowing a greater or smaller quantity of bagasse to be forced out at the lower end of the chamber, between the contracted end of the same and cone, at each descent of the plunger. The lower end of the cylinder is tapered, as shown, and may be constructed in any desired way to admit of contraction and expansion. In the present instance I have shown the lower tapered end slitted at suitable distances apart, and provided with a tapered collar, K, having inclines m on its under surface. These inclines m rest on pins or projections n, secured to the lower end of the cylinder, and as the collar K is turned it causes the sections of the slitted end to overlap each other, thereby decreasing the size of the outlet-opening. The upper part of the cylinder, starting just below the openings a, is of smaller diameter than the remaining portion, and, together with the enlargement of the steam-pipe at this point, tends to keep the compressed mass down, and prevents its following the plunger on the upstroke and filling the space made for the new material; or, instead of the above, springs or any suitable construction for producing the same result will serve the same purpose.

Having described the construction of the machine, I will now proceed to describe its operation.

The cane stripped of its leaves is introduced into the trough or receiver A, and carried by the feed-rolls B to the revolving cutter C, where the cane is cut into small pieces. All the cut cane and any juice that may be extracted during the cutting operation fall down the incline in the receiver and into the cylinder D. The plunger E is supposed to come down even with the top of the perforated cylinder D, and to rise up, so as to alternately close and open the opening a, for the cut cane to pass into the cylinder from the spout, and at each upstroke the cut cane falls through and fills the space caused by the ascent of the plunger. The cane is prevented from rising in the chamber D by the decrease in diameter of the cylinder at this point, and also the enlargement of the steam-pipe, as shown at o. As the entire mass is forced down lower all of the juice that can be extracted by direct pressure is expressed in the upper part of the chamber above the annular trough g, and is collected in that trough and carried off by pipe i to the proper receiving-tank. The juice extracted by this process is pure cane-juice, and alone is equal in amount to that extracted in the complete operation of any existing process and better in quality than that extracted from roller-mills, inasmuch as there is not nearly the amount of outside coating of the cane in it. After passing into the lower part of the chamber it is met by a current of steam, water, either hot or cold, or any suitable liquid, which is forced through the mass, carrying with it the remaining saccharine matter, which is collected and discharged by the lower trough. The bagasse is forced out of the lower end continuously in a compact mass in good shape for transportation and burning. The amount of pressure in the chamber is regulated by contraction at the lower end of the chamber or by raising the cone on the bar connected to the steam-pipe.

If desired, the arrangement for cutting the cane can be separated from the press, as the latter can be used for extracting the juice from uncut canes. The different parts are connected together by suitable belts and gearing, so adapted as to give the required relative speed thereto.

It is evident that many slight changes in the construction might be resorted to without departing from the spirit of my invention, as I consider myself at liberty to use any slight changes in the construction of the different parts which come within the spirit and scope of my invention, and hence I would have it understood that I do not limit myself to the exact construction shown and described; but, Having fully described my invention, what I claim as new, and desire to secure by Letters Patent, is—

1. The combined cutter and press for cutting and expressing the juices of cane or other material, consisting essentially in the combination, with a cutting device or apparatus, of a chambered press and a conduit for conveying the cut cane or other material into the upper portion of the press-chamber, the latter being perforated for the escape of the juice, and having a discharge-outlet at the lower end for the intermittent expulsion of bagasse, whereby the operation of cutting and pressing is rendered continuous, substantially as set forth.

2. In a machine for extracting the juice from cane or other material, the combination, with a perforated press-chamber, the lower end of which is constructed to be contracted or expanded in size to regulate the discharge of the cane after the juice has been expressed therefrom, and a feed-opening located in the side of the press-chamber, near its upper end, and an inclined conduit leading to said feed opening, of a plunger of sufficient length to close the feed-opening and cut off the supply of cane to the press-chamber while pressure is being imparted to the cane, substantially as set forth.

3. In a machine for extracting the juice from cane or other material, the combination, with a plunger, of a perforated press-chamber provided with a discharge-opening constructed to be expanded or contracted to regulate the discharge of the cane after the juice has been expressed therefrom, substantially as set forth.

4. In a machine for extracting the juice from cane or other material, a perforated press-chamber provided with two or more annular troughs and with an adjustable discharge-opening, substantially as set forth.

5. In a machine for extracting the juice from cane or other material, the combination, with a perforated press-chamber having a feed-opening in its side, near its upper end, and an inclined conduit connecting with said feed-opening, of a plunger of sufficient length to open and close said feed-opening, substantially as set forth.

6. In a machine for extracting the juice from cane or other material, the combination, with a perforated press-chamber, of a plunger located in a suitable guide or extension of the press-chamber, a crank-shaft, and a link, substantially as set forth.

7. In a machine for cutting and extracting the juice from cane or other material, the combination, with a perforated press-chamber and a plunger, of a cutting device arranged to allow the cut cane or other material to be fed to the press-chamber below the plunger, substantially as set forth.

8. In a machine for extracting the juice from cane or other material, the combination, with a perforated press chamber and a plunger, of a steam-pipe, rod, or shaft passing centrally through the same, said chamber and pipe, rod, or shaft constructed to prevent the pressed material from rising after the plunger has ascended, substantially as set forth.

9. In a machine for cutting and extracting the juice from cane or other material, the combination, with a perforated press-chamber and a plunger, of a steam or water pipe passing through the same for the purpose of introducing steam, water, or other liquid into the interior of the compressed mass while the same is under pressure, substantially as set forth.

10. In a machine for cutting and extracting the juice from cane or other material, the combination, with a perforated pressing-chamber and a steam or water pipe passing centrally through the same, of a rod secured to the lower end of the steam-pipe and a cone adapted to increase or diminish the size of the exit-opening of the chamber, substantially as set forth.

11. The process of extracting saccharine substances, consisting in compressing the material, and, while the material is under compression, forcing steam or liquid outwardly and through the mass of compressed material, substantially as set forth.

In testimony that I claim the foregoing I have hereunto set my hand.

GEORGE W. SOULE.

Witnesses:
   A. J. HYDE,
   BEN CLOAK.